United States Patent
Kaneda

[19]

[11] Patent Number: 6,040,682
[45] Date of Patent: Mar. 21, 2000

[54] CIRCUIT FOR PREVENTING BATTERY DAMAGE

[75] Inventor: Fumio Kaneda, Camarillo, Calif.

[73] Assignee: The United States of America as represented by the Secretary of the Navy, Washington, D.C.

[21] Appl. No.: 09/243,271

[22] Filed: Feb. 2, 1999

[51] Int. Cl.[7] .................................................. H02J 7/00
[52] U.S. Cl. ........................................... 320/136; 320/135
[58] Field of Search ..................... 320/136, 137, 320/127, 135; 361/187

[56] References Cited

U.S. PATENT DOCUMENTS

| | | | |
|---|---|---|---|
| 4,721,899 | 1/1988 | Weil | 324/415 |
| 5,691,619 | 11/1997 | Vingsbo | 320/127 |
| 5,784,268 | 7/1998 | Steffek et al. | 361/111 |
| 5,825,099 | 10/1998 | Kwon | 320/102 |

*Primary Examiner*—Peter S. Wong
*Assistant Examiner*—Lawrence Luk
*Attorney, Agent, or Firm*—David S. Kalmbaugh

[57] ABSTRACT

A circuit for disconnecting a battery from a battery powered load whenever the battery's output voltage drops below a specified battery cell voltage. The circuit includes a relay having a coil and a normally open contact which connects the battery to its load when the coil is energized. When the battery's output voltage drops below the specified battery cell voltage, which is about 1.8 volts per cell, the relay coil will de-energize disconnecting the battery from the load. A battery charger continuously charges the battery to maintain its output voltage. The relay coil is energized closing the relay contact when the battery charges to a predetermined charging voltage which is approximately 2.2 VDC per cell. Closing the relay contact again connects the battery to its load.

15 Claims, 1 Drawing Sheet

CIRCUIT FOR PREVENTING BATTERY DAMAGE

BACKGROUND OF THE INVENTION

1. Field of the Invention

This invention relates generally to battery powered circuits. More particularly, the present invention relates to a circuit which protects a battery connected to a load from over discharge.

2. Description of the Prior Art

A battery's life may be shortened or the battery may be damaged when the battery over discharges. In addition, a malfunction may occur when a battery is supplying power to a device/load and the battery is operating at lower voltage than the recommended voltage for the device. Thus, there is a need for an electronics circuit to disconnect the device/load from the battery when the battery's output voltage drops below a specified battery cell voltage.

SUMMARY OF THE INVENTION

The present invention overcomes some of the disadvantages of the past including those mentioned above in that it comprises a highly reliable and cost effective electronics circuit which disconnects a battery from a battery powered load whenever the battery's output voltage drops below a specified battery cell voltage.

The circuit of the present includes a relay having a coil and a normally open contact which connects the battery to its load when the coil is energized. When the battery's output voltage drops below the specified battery cell voltage, which is about 1.8 volts per cell, the relay coil will de-energize disconnecting the battery from the load. A battery charger continuously charges the battery to maintain the battery's output voltage. The relay coil is energized closing the relay contact when the battery charges to a predetermined charging voltage which is approximately 2.2 VDC per cell. Closing the relay contact again connects the battery to its load.

DETAILED DESCRIPTION OF THE PREFERRED EMBODIMENT

Figure 1:
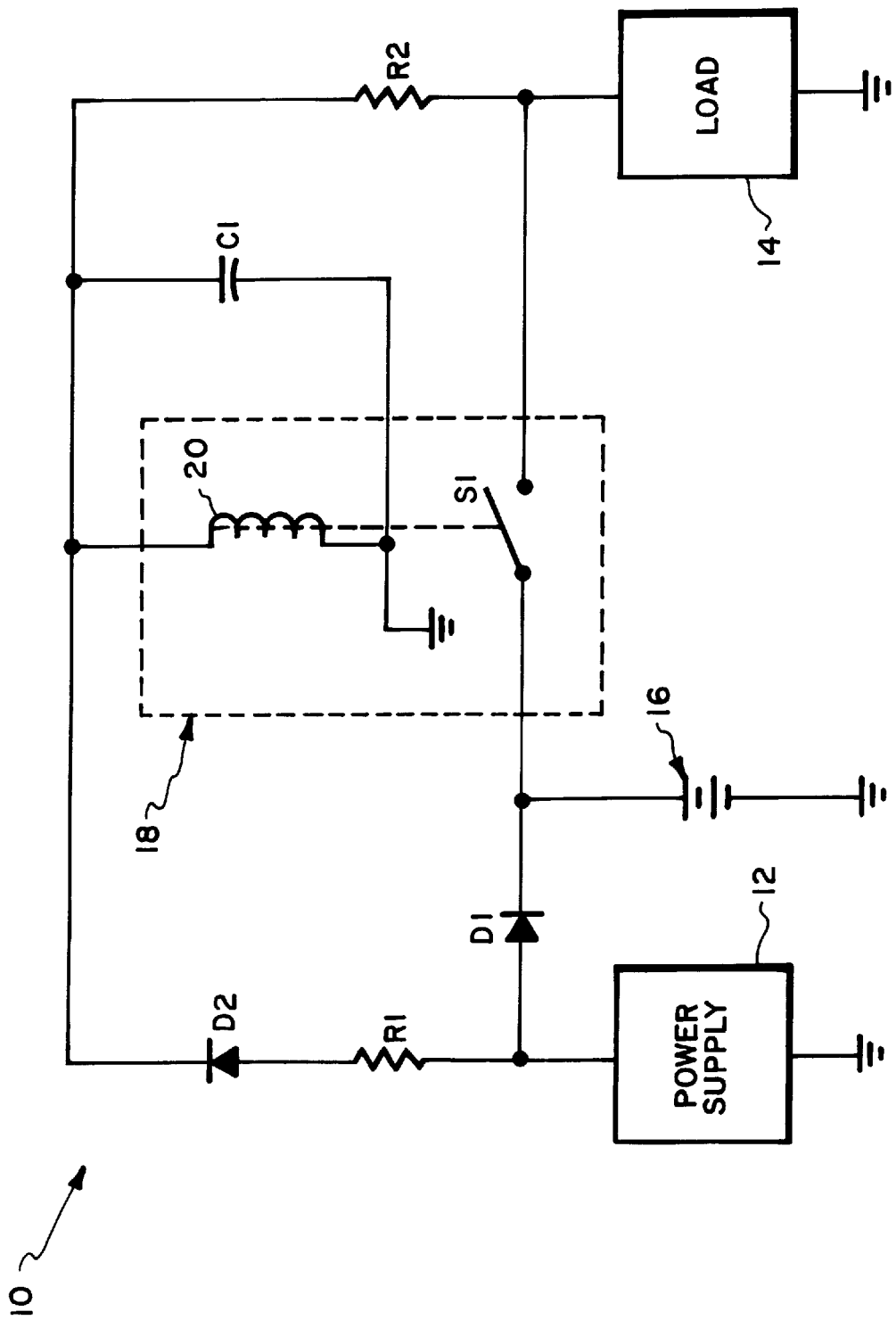
FIG. 1 is a detailed electrical circuit diagram of a circuit for preventing battery damage which constitutes a preferred embodiment of the present invention.

Referring to FIG. 1 there is shown a circuit, designated generally by the reference numeral 10, which prevents damage to a battery 16 from over discharging. When battery 10 discharges below a pre-selected cell voltage, normally open contact S1 of relay 18 will open disconnecting battery 10 from load 14. Circuit 10 then prevents load 14 from malfunctioning since the input power required by load 14 is turned off whenever contact S1 of relay 18 opens.

Battery 16 is a 24 VDC lead acid battery. Whenever battery 16 discharges to a pre-selected voltage of 1.8 volts per cell, coil 20 of relay 18 de-energizes opening contact S1 which disconnects load 14 from battery 16.

A Potter and Brumfield T98124 relay was used as relay 18 in the preferred embodiment of the present invention. Coil 20 of relay 18 has a resistance of 660 ohms, an activating current of 22.7 mA (or 15V at relay terminal) and a de-activation current of 8.8 mA (or 5.8 V at relay terminal. The Potter and Brumfield T98124 relay is commercially available from Siemens Electromechanical Components, Inc. of Princeton, Ind.

Circuit 10 includes a 28 VDC power supply 12 which operates as a battery charger for battery 16. Connected to the output of power supply 12 is a resistor R1 and the anode of a diode D1 which is a diode with a forward voltage drop 0.5 volts. The cathode of diode D1 is connected to the positive terminal of battery 16 and the contact S1 of relay 18. Resistor R1 is connected to the anode of diode D2. The cathode of diode D2 is connected to coil 20 of relay 18 and the positive terminal of a capacitor C1 and a resistor R2 which is also connected to load 14.

Resistor R1 is a current limiting resistor which sets the activation voltage for coil 20 of relay 18. Resistor R1 also prevents the premature connection of load 14 to battery 16 until battery 16 and power supply 12 are ready to connect to load 14. The value of R1 is determined in accordance with the following equation:

$$\text{Activating Current} = \frac{\text{Power Supply Voltage} - D2 \text{ Voltage}}{R1 + \text{Coil Resistance}} \quad (1)$$

For a load voltage of 26 VDC, the value for R1 is may be calculated using equation one as follows:

$$R1 = \frac{26 - 0.5}{22.7 \times 10^{-3}} - 660 = 463 \text{ ohm}$$

The resistance value selected for resistor R1 was 470 ohms. The resistor's power rating is determined in accordance with the following equation:

$$P_{max} = \left(\frac{\text{Power Supply Voltage} - D2 \text{ Voltage}}{R1 + \text{Coil Resistance}}\right)^2 \times R1 \quad (2)$$

For an output voltage of 32 VDC from power supply 12, the resistor's power rating may be calculated using equation two as follows:

$$P_{max} = \left(\frac{32 - 0.5}{470 + 660}\right)^2 \times 470 = 0.37 \text{ watts}$$

Based on the values calculated using equations one and two the resistor R1 used in circuit 10 is a ½ watt, 10%, 470 ohm resistor.

Diodes D1 and D2 are isolation diodes. Diode D1 prevents battery 16 from discharging through resistor R1, diode D2 and coil 20 of relay 18 thereby energizing coil 20 of relay 18. Diode D1 also isolates battery 16 from power supply 12 when power supply 12 operates as a discharge path. For example, when power supply 12 is connected in a reverse polarity configuration, power supply 12 would form a discharge path without the presence of diode D1.

Diode D2 prevents capacitor C1 discharge through resistor R1, diode D1 and load 14.

Resistor R2 is a current limiting resistor which sets the deactivating voltage for coil 20 and also provides a load cutoff voltage for battery 16.

The value of resistor R2 is determined in accordance with the following equation:

$$\text{De-activating Current} = \frac{\text{Release Voltage} - D2 \text{ Voltage}}{R2 + \text{Coil Resistance}} \quad (3)$$

When load 14 is released at 1.8 VDC per cell voltage for battery 16, R2 is calculated using equation three as follows:

$$R2 = \frac{1.8 \times 12 - 0.5}{8.8 \times 10^{-3}} - 660 = 1737 \text{ ohm}$$

The resistance value selected for resistor R2 was 1.8 k-ohms. The resistor's power rating is determined in accordance with the following equation:

$$P_{max} = \left(\frac{\text{Power Supply Voltage} - D2 \text{ Voltage}}{R2 + \text{Coil Resistance}}\right)^2 \times R2 \quad (4)$$

For an output voltage of 32 VDC from power supply 12, the resistor's power rating may be calculated using equation four as follows:

$$P_{max} = \left(\frac{32 - 0.5}{1.8 \times 10^3 + 660}\right)^2 \times 1.8 \times 10^3 = 0.30 \text{ watts}$$

Based on the values calculated using equations one and two the resistor R2 used in circuit 10 is a ½ watt, 10%, 1.8 k-ohm resistor.

Capacitor C1 which is a 1000 uf damping capacitor. The C1, R2, coil resistance of coil 20 time constant allows coil 20 to remain energized whenever the battery voltage for battery 20 drops below the pre-selected voltage of 1.8 volts per cell for a very short time period. The battery voltage may drop below 1.8 volts per cell due to noise, glitches or a load surge. Capacitor C1 also eliminates the need for an EMF protective diode since capacitor C1 prevents coil 20 from being open circuited.

At this time it should be noted that a resistance value of 1.9 k-ohm for resistor R2 will result in coil 20 de-energizing opening contact S1 whenever battery 16 discharges to a pre-selected voltage of 1.9 volts per cell.

Circuit 10 will not reconnect load 14 to battery 16 until battery 16 reaches a charging voltage which is approximately 2.2 VDC per cell. The relay coil 20 is then energized closing contact S1 which connects battery 20 to load 14. Battery 16 may be disconnected from load 14 when, for example, lighting interferes with the operation of circuit 10.

From the foregoing, it may readily be seen that the present invention comprises a new, unique and exceedingly useful circuit for preventing battery damage which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. A circuit for preventing battery damage to a battery coupled to a load, said circuit comprising:

a battery charger connected to said battery, said battery charger providing a direct current voltage to said battery to maintain a charge on said battery at a predetermined charging voltage;

a relay having a coil and a contact, the contact of said relay having a first terminal connected to said battery and a second terminal connected to said load;

deactivation means connected to the coil of said relay, said deactivation means de-energizing the coil of said relay to open the contact of said relay whenever an output voltage of said battery drops below a predetermined battery cell voltage, said battery being decoupled from said load whenever the contact of said relay is opened; and activation means connected to the coil of said relay, said activation means energizing the coil of said relay to close the contact of said relay whenever the output voltage of said battery rises to said predetermined charging voltage, said battery being coupled to said load whenever the contact of said relay is closed.

2. The circuit of claim 1 wherein said battery charger comprises a 28 volt power supply.

3. The circuit of claim 1 wherein said deactivation means and said activation means each comprise a current limiting resistor.

4. The circuit of claim 1 wherein said deactivation means comprises a 1.8 Kilohm resistor.

5. The circuit of claim 1 wherein said activation means comprise a 470 ohm resistor.

6. The circuit of claim 1 further comprising:

a first diode having an anode connected to said battery charger and a cathode connected to said battery; and a second diode having an anode connected to said activation means and a cathode connected to the coil of said relay.

7. The circuit of claim 1 further comprising a capacitor having a positive terminal connected to said deactivation means and the coil of said relay and a negative terminal connected to the coil of said relay.

8. The circuit of claim 7 wherein said capacitor comprises a 1000 microfarad capacitor.

9. A circuit for preventing battery damage to a battery coupled to a load, said circuit comprising:

a battery charger having an output;

a first resistor having a first terminal connected to the output of said battery charger and a second terminal;

a first diode having an anode connected to the output of said battery charger and a cathode connected to a positive terminal of said battery;

a second diode having an anode connected to the second terminal of said first resistor and a cathode;

a relay having a coil and a normally open contact, the coil of said relay having a first terminal connected to the cathode of said second diode and a second terminal connected to a ground, the normally open contact of said relay having a first terminal connected to the cathode of said first diode and a second terminal connected to an input of said load;

a capacitor having a positive terminal connected to the cathode of said second diode and a second terminal connected to said ground; and a second resistor having a first terminal connected to the cathode of said second diode and a second terminal connected to the input of said load.

10. The circuit of claim 9 wherein said battery charger comprises a 28 volt power supply.

11. The circuit of claim 9 wherein said first resistor comprises a 470 ohm resistor.

12. The circuit of claim 9 wherein said second resistor comprises a 1.8 Kilohm resistor.

13. The circuit of claim 9 wherein said second resistor comprises a 1.9 Kilohm resistor.

14. The circuit of claim 9 wherein said capacitor comprises a 1000 microfarad capacitor.

15. A circuit for preventing battery damage to a battery coupled to a load, said circuit comprising:

a 28 volt power supply having an output;

a 470 ohm resistor having a first terminal connected to the output of said 28 volt power supply and a second terminal;

a first diode having an anode connected to the output of said 28 volt power supply and a cathode connected to a positive terminal of said battery;

a second diode having an anode connected to the second terminal of said 470 ohm resistor and a cathode;

a relay having a coil and a normally open contact, the coil of said relay having a first terminal connected to the cathode of said second diode and a second terminal connected to a ground, the normally open contact of said relay having a first terminal connected to the cathode of said first diode and a second terminal connected to an input of said load;

a 1000 microfarad capacitor having a positive terminal connected to the cathode of said second diode and a second terminal connected to said ground; and a 1.8 Kilohm resistor having a first terminal connected to the cathode of said second diode and a second terminal connected to the input of said load.

* * * * *